(12) United States Patent
Auguet et al.

(10) Patent No.: US 9,461,454 B2
(45) Date of Patent: Oct. 4, 2016

(54) DEVICE FOR CONNECTING A BATTERY TO AN ELECTRIC OR HYBRID VEHICLE, AND BATTERY HOUSING COMPRISING SAID CONNECTION DEVICE

(75) Inventors: Thierry Auguet, Clermont-Ferrand (FR); Pierre-Alain Magne, Clermont-Ferrand (FR)

(73) Assignees: COMPAGNIE GENERALE DES ESTABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 894 days.

(21) Appl. No.: 13/814,184

(22) PCT Filed: Aug. 1, 2011

(86) PCT No.: PCT/EP2011/063217
§ 371 (c)(1),
(2), (4) Date: Apr. 9, 2013

(87) PCT Pub. No.: WO2012/016949
PCT Pub. Date: Feb. 9, 2012

(65) Prior Publication Data
US 2013/0307327 A1 Nov. 21, 2013

(30) Foreign Application Priority Data

Aug. 2, 2010 (FR) .................................... 10 56362

(51) Int. Cl.
| | | |
|---|---|---|
| *H02H 3/02* | (2006.01) | |
| *B60K 28/14* | (2006.01) | |
| *B60L 3/00* | (2006.01) | |
| *B60L 3/04* | (2006.01) | |
| *B60L 11/18* | (2006.01) | |
| *H01H 39/00* | (2006.01) | |
| *H01M 2/10* | (2006.01) | |
| *H01M 2/34* | (2006.01) | |
| *H01M 10/48* | (2006.01) | |
| *H02J 7/00* | (2006.01) | |

(52) U.S. Cl.
CPC .............. *H02H 3/021* (2013.01); *B60K 28/14* (2013.01); *B60L 3/0046* (2013.01); *B60L 3/04* (2013.01);
(Continued)

(58) Field of Classification Search
CPC ..... H02H 3/021; B60K 28/14; B60L 3/0046; B60L 3/04; B60L 11/1896; H01H 39/00; H01M 2/1083; H01M 2/34; H01M 10/48
See application file for complete search history.

(56) References Cited

U.S. PATENT DOCUMENTS 5,034,620 A * 7/1991 Cameron ................ B60R 16/04
180/282

(Continued)

FOREIGN PATENT DOCUMENTS

| EP | 0 639 844 | 2/1995 |
|---|---|---|
| EP | 0 791 942 | 8/1997 |

(Continued)

OTHER PUBLICATIONS

Hui, D. H. P., "The Next Leap for Electronics", 2007, (two pages).

*Primary Examiner* — Zeev V Kitov
(74) *Attorney, Agent, or Firm* — Cozen O'Connor

(57) ABSTRACT

A connection device 3 for connecting a battery 2 to an electric or hybrid motor vehicle, comprising at least one input 3a capable of being connected to a terminal of the battery and an output 3b capable of being connected to a first terminal of an electrical circuit of the vehicle. The device 3 also comprises an electrical-circuit cutoff device 8 mounted in series between the input 3a and the output 3b of the connection device 3. The cutoff device 8 comprises a pyrotechnic igniter connected to control terminals, the electrical opening of the cutoff device 8 being controlled by an electrical control signal applied to the said control terminals.

9 Claims, 5 Drawing Sheets

(52) U.S. Cl.
CPC ........... *B60L 11/1896* (2013.01); *H01H 39/00* (2013.01); *H01M 2/1083* (2013.01); *H01M 2/34* (2013.01); *H01M 10/48* (2013.01); *H01H 2039/008* (2013.01); *H02J 7/0031* (2013.01); *Y02T 90/34* (2013.01)

(56) References Cited

U.S. PATENT DOCUMENTS

| | | | | |
|---|---|---|---|---|
| 5,818,121 | A * | 10/1998 | Krappel | B60K 28/14 180/271 |
| 6,100,702 | A * | 8/2000 | Hagen | G01R 9/16542 324/509 |
| 2004/0174649 | A1* | 9/2004 | Ito | B60R 21/017 361/91.1 |
| 2005/0090154 | A1* | 4/2005 | Ikeda | H01R 9/245 439/709 |
| 2005/0179424 | A1* | 8/2005 | Mayumi | H02M 3/1563 323/282 |
| 2006/0087775 | A1 | 4/2006 | Osawa | |

FOREIGN PATENT DOCUMENTS

| | | |
|---|---|---|
| EP | 1 153 787 | 11/2001 |
| JP | 2000 038035 | 2/2000 |
| JP | 2001 023700 | 1/2001 |
| JP | 2001 126685 | 5/2001 |
| WO | WO 95/31033 | 11/1995 |
| WO | WO 02/099356 | 12/2002 |
| WO | WO 2010/050432 | 5/2010 |

* cited by examiner

DEVICE FOR CONNECTING A BATTERY TO AN ELECTRIC OR HYBRID VEHICLE, AND BATTERY HOUSING COMPRISING SAID CONNECTION DEVICE

RELATED APPLICATIONS

This is a U.S. National Phase Application under 35 USC 371 of International Application PCT/EP2011/063217 filed on Aug. 1, 2011.

This application claims the priority of French application no. 10/56362 filed Aug. 2, 2010, the entire content of which is hereby incorporated by reference.

FIELD OF THE INVENTION

The present invention relates to the field of motor vehicles of the electric or hybrid type requiring the use of electrical batteries. In particular, the present invention relates to the field of electrical battery connection devices in a motor vehicle.

BACKGROUND OF THE INVENTION

"Electric motor vehicle" means a vehicle as defined in United Nations regulation No. 100 concerning the homologation of battery-powered electric vehicles.

In order to provide the vehicle with increased range, a substantial reserve of electrical power is required. This leads to the use of a battery that is relative bulky, relatively heavy and may present risks from an electrical point of view.

It is known practice to use a "passive" fuse to isolate an electrical element when the latter delivers an electrical current higher than a value determined by the characteristics of the fuse. The fuse then operates like a cutout switch. However, the fuse reacts only to an electrical current and does not make it possible to isolate the electrical element in the event of other malfunctions on the electrical circuit.

It is also possible to provide controlled switches for isolating an electrical element. However, these controlled switches are not always fast enough to protect people who are likely to be in contact with the electrical element. Moreover, the controlled switch may also reconnect the electrical element even though the electrical malfunction is not fully corrected.

Other cutout switches are known, for example those described in documents EP0639844, EP0688699, EP0791942, EP0936648, WO9731385. Such cutout switches are not satisfactory in terms of speed and/or resistance to electrical arcs.

There also exist cutout switches with pyrotechnic elements, as described in documents EP0665566 or FR2869450. However, these devices are designed for particular systems, such as airbag systems.

SUMMARY OF THE INVENTION

One object of the present invention is to generally enhance the safety of vehicles with electrical or hybrid propulsion, and notably to protect the elements of the electrical circuit.

In particular, an object of the present invention is to allow a controllable, rapid, reliable and permanent isolation of the battery of a motor vehicle, notably in the event of imminent risk of damage to an electrical element of the vehicle. In other words, the an object of the present invention is to preserve the elements of the electrical circuit in the event of a malfunction.

Accordingly, according to one embodiment, a connection device is proposed for connecting a battery to an electric or hybrid motor vehicle, comprising at least one input capable of being connected to a terminal of the battery and an output capable of being connected to a first terminal of an electrical circuit of the vehicle. The device also comprises an electrical-circuit cutoff device mounted in series between the input and the output of the connection device. The cutoff device comprises a pyrotechnic igniter connected to control terminals, the electrical opening of the cutoff device being controlled by an electrical control signal applied to the said control terminals.

Therefore, an embodiment of the invention includes an electrical-circuit cutoff device of the type that is controlled by a pyrotechnic charge in order to isolate the battery for powering an electric vehicle. The opening of the electrical circuit is directly obtained by the igniting of the pyrotechnic charge. For this it is sufficient to apply an appropriate control signal to the terminals of the pyrotechnic charge, for example a control voltage. Preferably, in order to ensure an ultra-rapid triggering control, the control signal is generated by electrical means. The control signal may be generated as a function of various parameters, such as the temperature, the current or the voltage, and makes it possible to define a triggering threshold for each of these parameters. Moreover, it is possible to obtain a precise adjustment of the triggering threshold of the cutoff device, unlike "passive" fuses for which there may be a difference between the maximum current indicated on the fuse and the real maximum current before opening of the electrical circuit.

The cutoff device may comprise a first and a second electrical pole connected to the input and to the output of the connection device, the cutoff device being designed to interrupt the electrical continuity between the said first and second electrical poles. The electrical-circuit cutoff device may comprise a contact member in the form of a movable element sliding inside the poles between which it is necessary to establish or cut off the electrical connection. In the closed position of the electrical contact, the contact member provides a bridging and a good electrical contact between poles, and in the open position of the circuit, the place initially occupied by the contact member is taken by an isolating button.

It is known that, through the inductances that exist on the electrical circuit to be protected and because of the particularly high current intensities, an electrical arc will appear between the pole and the contact member at the moment when the contact member is no longer in contact with the first pole. This electrical arc causes the ionisation of the atmosphere inside the cutoff device and ensures that electrical continuity is maintained. But, with the cutoff device described above, the button which pushes back the contact member is itself made of a material that does not conduct electricity and withstands electrical arcs.

The connection device may also comprise a control unit capable of delivering the electrical control signal to the said control terminals.

The control unit may be capable of detecting, notably by voltage measurements, an electrical over current or overvoltage delivered by the battery and is capable of delivering the electrical control signal when the electrical over current or overvoltage is detected. The control unit may also be capable of delivering the electrical control signal when the battery temperature is higher than a determined threshold. In particular, in the event of an electrical anomaly, the control unit is capable of detecting this malfunction and of interrupting the electrical contact between the battery and the vehicle. Thus, the connection device makes it possible to ensure that the terminals of the battery, and consequently the electrical circuit of the vehicle in its entirety, are isolated from the chassis of the vehicle. In the contrary case, the cutoff device makes it possible to isolate the battery from the faulty electrical circuit of the vehicle.

More generally, the control unit may be capable of receiving values of voltage, of current and/or of temperature of the battery, and be capable of connecting or of keeping connected the battery terminal and the first terminal of the electrical circuit when a value of current flowing in the battery terminal is below a determined threshold (absence of over current), and/or when a value of voltage is higher than a determined threshold (absence of overvoltage), and/or when a value of voltage is below a determined threshold (absence of overvoltage), and/or when a value of temperature of the battery is higher than a determined threshold.

The control unit may receive measurements of voltage between the battery terminal and a reference potential, and/or measurements of current flowing in the battery terminal, and/or measurements of temperature of the battery, when the vehicle starts up and/or at regular intervals during the operation of the vehicle, for example between 1 second and 1 minute.

The device may also comprise a manually controlled breaker mounted in series, between the input of the connection device and the cutoff device.

The manually controlled breaker may comprise a socket furnished with spaced electrical contact means and suitable for being coupled to a removable member furnished with a cutoff bar such that, after coupling, the cutoff bar of the removable member connects the electrical contact means of the socket. The socket can be attached to the connection device and the removable member of the manually controlled breaker may be accessible when it is coupled to the socket. One of the contact means of the socket may be electrically connected to the input of the connection device, and the other contact means of the socket may be connected to the cutoff device.

Therefore, since the battery may contain a considerable electrical charge, it is possible to isolate the battery simply by separating the removable member from the socket such that work on the battery housing, in particular when it is installed or removed, or work on electrical members of the vehicle can be protected.

The connection device may also comprise a cutout switch mounted in series, between the cutoff device and the output of the connection device, the electrical opening of the cutout switch being controlled by an electrical control signal applied to the said cutout switch.

Alternatively, the connection device may comprise several outputs capable of being electrically connected to electrical members of the vehicle, and may also comprise a relay device mounted between the cutoff device and the outputs. The relay device comprises a cutout switch and optionally a fuse mounted in series between the cutoff device and each of the outputs, the electrical opening of the cutout switch being controlled by an electrical control signal applied to the said cutout switch.

The control unit may also be capable of delivering the electrical control signal applied to the said cutout switch.

An aspect of the invention relates to a battery housing for an electric or hybrid vehicle, comprising a battery and a connection device described above.

The battery housing may comprise:
an outer casing delimiting a receiving chamber,
an internal partition delimiting at least one compartment in the said chamber,
at least one accumulator block being placed in the said compartment and comprising an insulating enclosure for receiving an electrical-power accumulator assembly, the electrical cutoff device being mounted inside the outer casing.

The manually controlled breaker may be mounted on the outside of the outer casing. In particular, the socket of the manually controlled breaker may be attached to the outer casing and the removable member of the manually controlled breaker may be accessible on the outside of this casing when it is coupled to the socket.

The manually controlled breaker may be installed, at least partly, in an external hollow recess of the outer casing, this recess being able to open downwards.

The battery may comprise accumulator blocks electrically mounted in series.

The outer casing may comprise a dish-shaped support and a cover covering the support, the socket being for example mounted in the side wall of such a support.

BRIEF DESCRIPTION OF THE DRAWINGS

The present invention will be better understood on reading the detailed description of an embodiment taken as a non-limiting example and illustrated by the appended drawings in which.

DETAILED DESCRIPTION OF THE DRAWINGS

Figure 1:
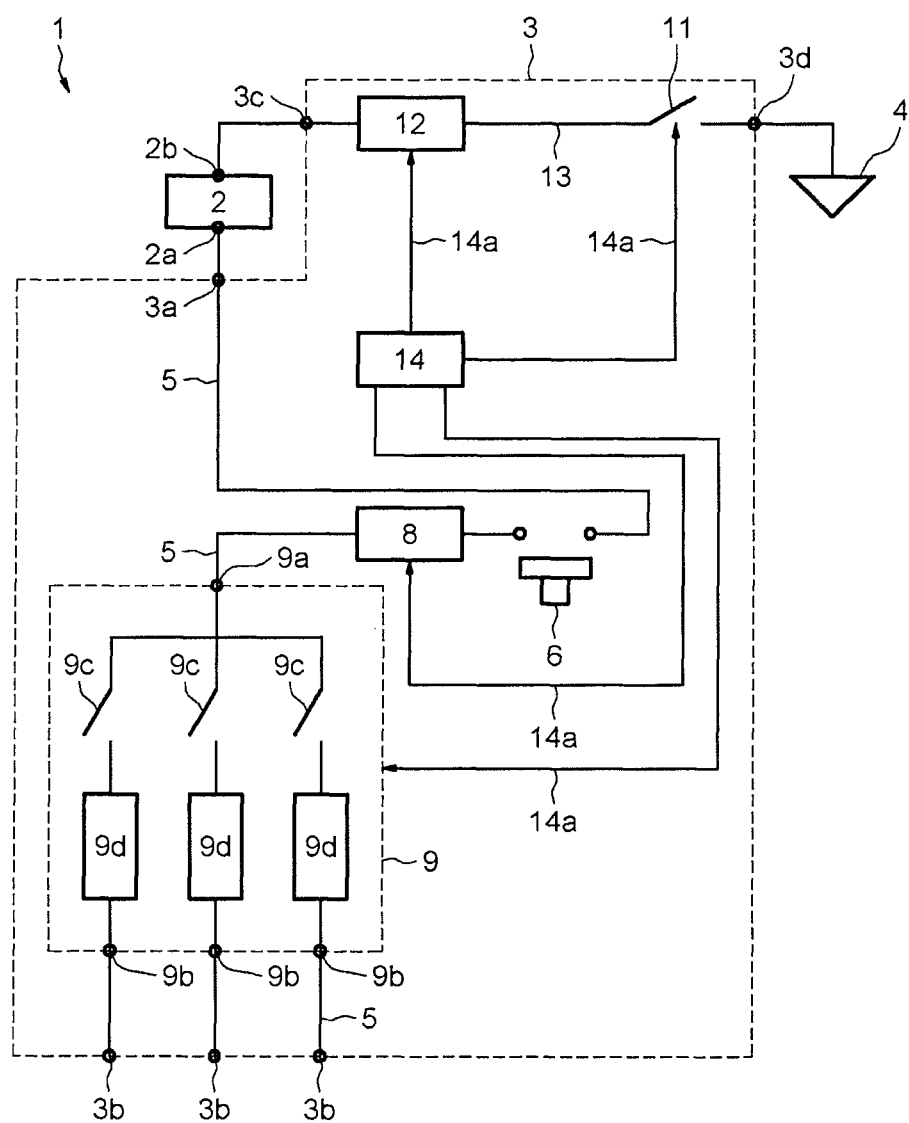
FIG. 1 represents schematically a battery with a connection device.

FIG. 1 shows schematically the main elements of a battery housing 1 comprising a battery 2 and a connection device 3. The battery 2 comprises a first terminal 2a and a second terminal 2b and several accumulator blocks (not shown). The accumulator blocks take the form, for example, of isolating enclosures containing electrical-power accumulator assemblies and are mounted in series between the first terminal 2a and the second terminal 2b of the battery. The first terminal 2a may, for example, be the positive terminal of the battery and the second terminal 2b may be the negative terminal of the battery 2.

The battery 2 is connected, via the connection device 3, to one or more electrical circuits of the motor vehicle, for example the electrical propulsion circuit, the electrical shock-absorber circuit, the electrical air-conditioning circuit, etc. In particular, the negative terminal 2b of the battery may be connected to a negative terminal 4 common to the electrical circuits, and the positive terminal 2a of the battery may be connected individually to each electrical circuit in order to supply electrical power. The positive terminal 2a and the negative terminal 2b are distinct from the chassis of the vehicle, of which the potential is the reference potential. The battery and the electrical circuits are therefore electrically isolated from the chassis of the vehicle.

The positive terminal 2a of the battery is connected to a first input 3a of the connection device 3. The connection device 3 also comprises outputs 3b that can each power one of the electrical circuits of the motor vehicle. The connection device 3 also comprises a manually controlled breaker 6, a cutoff device 8 and a relay device 9 which are mounted successively in series via connections 5 between the input 3a and the outputs 3b.

The negative terminal 2b of the battery is connected to a second input 3c of the connection device 3. The connection device 3 also comprises a second output 3d connected to the negative terminal 4 common to all the electrical circuits powered by the battery 2. A cutout switch 11, for example a controllable switch, and a second cutoff device 12 are mounted successively in series via connections 13, between the input 3c and the output 3d.

The connection device 2 also comprises a control unit 14 connected via connections 14a to the cutoff device 8 and to the cutoff device 12, to the relay device 9 and to the cutout switch 11. The connections 14a can be made by electrical wires and allow the interchange of signals with the control unit 14. In particular, the control unit 14 sends control signals to the cutoff device 8, to the cutoff device 12, to the relay device 9 and to the cutout switch 11.

The relay device 9 comprises an input 9a connected, via a connection 5, to the output of the electrical-circuit cutoff device 8, and outputs 9b connected via connections 5 to the outputs 3b of the connection device 3. Associated with each output 9b are a cutout switch, made for example in the form of controlled switches 9c, and a fuse 9d, mounted in series between the input 9a and the said output 9b. Each switch 9c is controlled by the control unit 14 and controls the electrical power supply of the electrical circuit connected to the corresponding output 3b. The fuse 9d is used to open the electrical contact for powering the said electrical circuit when the intensity of the current flowing in the electrical circuit is higher than a threshold determined by the physical properties of the fuse 9d. Thus, the control of the cutout switches 9c by the control unit makes it possible to select the various members of the vehicle that are powered by the battery 2, for example the electrical air-conditioning circuit, the electrical propulsion circuit, etc.

The control of the cutoff device 8 by the control unit 14 breaks the electrical contact between the battery 2 and the outputs 3b of the connection device 3. This control can be the result of the detection, via the control unit 14, of a serious and rapid malfunction requiring the intervention of a professional. The battery can then be reconnected to the outputs 3b only by replacement, at least in part, of the cutoff device 8, which can be carried out only by the said professional.

The manually controlled breaker 6 is used to manually disconnect the battery from the vehicle, notably when there is work on the vehicle or during the battery installation/removal step.

When an anomaly, for example an over current or an overvoltage, is detected by the control unit 14, the latter can control the cutoff device 8 and/or the cutoff device 12 of the battery housing, via the connection 14a. Specifically, a battery that is badly isolated or has an overvoltage may cause the said battery or another electrical element to overheat, or even cause damage to the said battery. The control of the cutoff device 8 or of the cutoff device 12 is used to rapidly and reliably open the electrical circuit of the battery 2 and to require the intervention of a professional on the vehicle in order to change the cutoff device.

Alternatively, the connection device may comprise a cutoff device mounted in series with only the negative terminal 2b of the battery, or may comprise a cutoff device mounted in series with only the positive terminal 2a.

Figure 2:
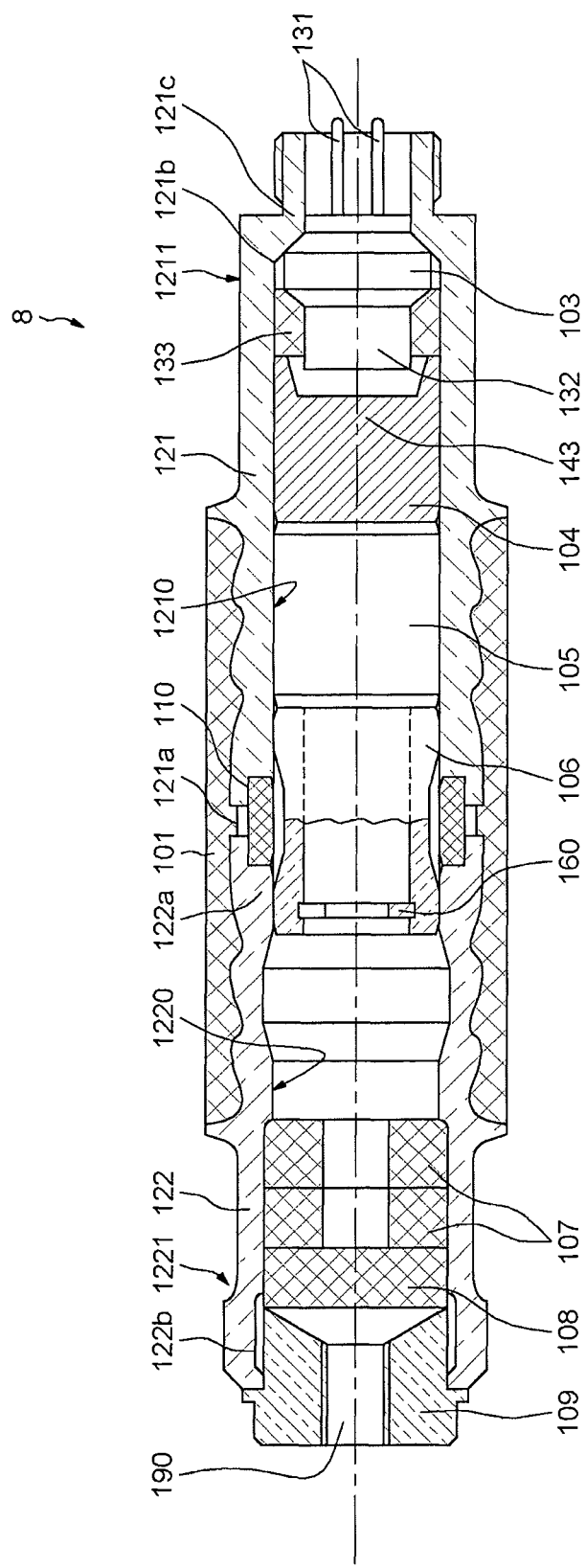
FIG. 2 is a general axial section of a cutoff device represented in the position in which the electrical circuit is closed.

The cutoff device 8 may advantageously be a pyrotechnic device such as for example that described in patent application FR2869450 to which it is possible to refer for further details. Such a cutoff device 8, represented in section in FIG. 2, is of generally cylindrical shape.

A first sleeve forms a first electrical pole 121, and a second sleeve forms a second electrical pole 122. These poles are preferably made of copper and have a generally tubular shape. They are connected via a sheath 101 made of a material that does not conduct electricity. The sheath 101 consists for example of several layers of resin-impregnated crossed glass fibre fabrics surrounding the respective external surfaces of the first and second poles 121, 122 while straddling them at least partially. The edges of each of the poles 121 and 122 facing one another terminate in a shoulder 121a, respectively 122a. The poles 121 and 122 are also positioned and held in place by a ring 110, mounted between the two poles and made of a material that does not conduct electricity and that withstands electrical arcs. In this way, the poles 121 and 122 are centred by the ring 110 and aligned with one another. The sheath 101 and the ring 110 mechanically connect to one another the poles 121 and 122 while keeping them electrically isolated from one another. It is possible to note that, as a variant, the sheath 101 and the ring 110 may be made in a single piece.

The pole 121 has a cylindrical bore 1210 over practically all of its length. The pole 121 comprises, at one of its ends, opposite to the ring 110, a shoulder 121b having on the inside a frustoconical surface. The pole 121 comprises a portion 121c comprising an external thread in order to accommodate for example an electrical connection.

A pyrotechnic igniter 103 is inserted inside the pole 121 and is immobilized at the end of the latter against the frustoconical surface of the shoulder 121b by means of a ring 133 that is set tight. The igniter 103 comprises terminals 131 that can be accessed from the outside of the cutoff device and that allow the pyrotechnic igniter to be connected. On the side opposite to these terminals 131, the pyrotechnic igniter 103 comprises a housing 132 accommodating the explosive charge. As a pyrotechnic igniter 103, it is possible to use for example those that are designed for triggering the operation of the inflatable cushions (commonly called "airbags") or safety belt pretensioners for motor vehicles.

Over approximately half of its axial length, the pole 122 has a bore 1220. The latter comprises two cylindrical bearing surfaces with the same diameter as the bore 1210. Between these two cylindrical bearing surfaces, a cylindrical bearing surface of greater diameter is provided. The pole 122 then forms a receptacle of which the internal cylindrical wall is machined to a diameter slightly greater than that of the two cylindrical bearing surfaces described above. The pole 122 has at an end opposite to the ring 110 a tapped zone 122b. A stopper 109, mounted by being screwed to the end of the pole 122 closes off the said receptacle. The stopper 109 comprises a tapped hole 190 which can accommodate an electrical connection screw. Each of the poles 121 and 122 also has an external bearing surface 1211, respectively 1221, that is used to connect an electrical conductor to each of the poles 121 and 122.

In the example illustrated, the cutoff device comprises a propulsion piston 104 made in one piece of material that withstands the heat given off by the explosion of the pyrotechnic charge. The piston 104 comprises a skirt placed so as to be oriented on the side of the pyrotechnic igniter. In this manner, a small internal chamber 143 remains between the piston 104 and the pyrotechnic igniter 103. At the time of the explosion, the pressure generated pushes back the lips of the skirt against the bore 1210, which improves the seal and prevents the gases and burnt particles from being propagated towards the left side of FIG. 2. Preferably, the skirt of the piston 104 can sustain a certain plastic deformation in order to perfect the seal. Certain plastic materials are fully suited to the production of the piston 104, such as for example an infusible polyimide available from DuPont de Nemours under the name "VESPEL SPI".

A button 105 is mounted adjacent to the piston 104. It is immaterial whether the button 105 is solid or hollow. The button 105 is preferably made of ceramic or of a material that does not conduct electricity and withstands flames and an electrical arc.

A contact member 106, made of electrically conductive material is mounted adjacent to the button 105, opposite to the piston 104. The contact member 106 is preferably made of copper. The contact member 106 forms a part that in this instance is independent of the electrical poles 121 and 122. In the example illustrated, the contact member 106 has the shape of a part that is substantially tubular comprising two peripheral ribs in order to come into contact with one of the poles 121 and 122 when the contact member 106 is in the position illustrated in FIG. 2 where it closes the electrical contact.

The external surfaces of the protuberances are pressed against the internal surfaces of the poles as shown in FIG. 2, by an elastic effect. The contact member 106 comprises slots allowing the deformation of the external surface of the contact member 106. FIG. 2 shows that the contact member 106 comprises an internal radial groove (one groove on each side), inside which is mounted a circlip 160 that exerts a radial force on the contact member. This produces an excellent electrical contact, with a contact strength as weak as possible between the poles and the contact member 106.

The contact member 106 is capable of sliding inside the bores 1210 and 1220, its shape and its external dimensions being adjusted by elastic deformation to the internal diameters of the said bores.

Finally, damping washers 107 and 108, preferably made of elastomer having high damping properties, are inserted at the end of the cutoff device. The washers 107 and 108 are inserted in front of the stopper 109 on which they can rest.

Thus, in this advantageous variant embodiment, the first sleeve 1210 contains a propulsion piston 104 interposed between the button 105 and the pyrotechnic igniter 103; the propulsion piston 104 is mounted slidingly inside the said first sleeve 210, the propulsion piston being capable of being set in motion by ignition of the pyrotechnic charge in order to repel the button 105.

Each of the sleeves 1210 and 1220 forms an internal bore inside which the contact member 106, the button 105 and the propulsion piston 104 can all slide. The adjustment of the contact member 106 relative to the poles 121 and 122 is slightly tight, so that the propulsion piston 104, the button 105 and the contact member 106 naturally retain the longitudinal position that is imposed on them on installation. The contact member 106, the button 105 and the piston 104 are, on installation, installed against one another in intimate contact with one another.

Figure 3:
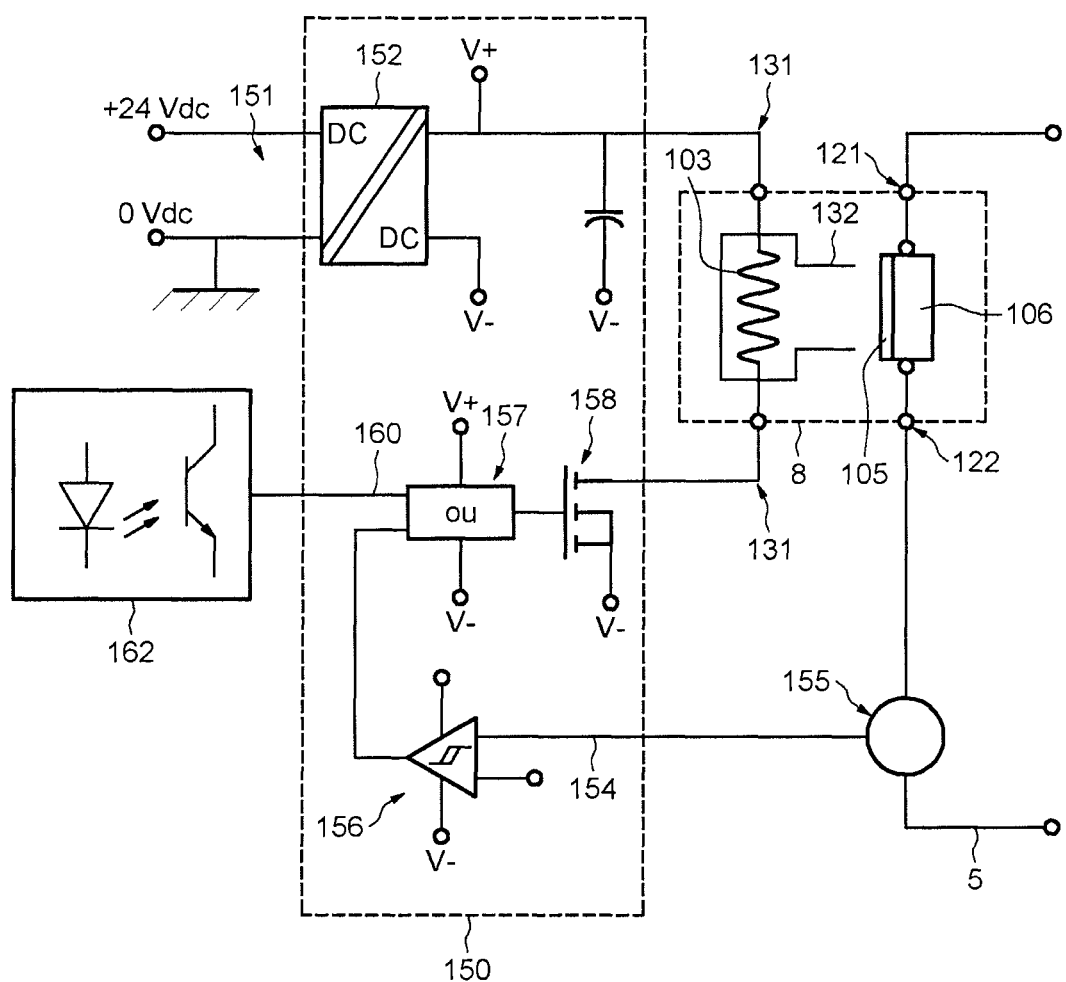
FIG. 3 illustrates a control circuit of a cutoff device.

FIG. 3 illustrates an electrical line 5 connected to the electrical poles, consisting for example of the two sleeves 121 and 122 illustrated in FIG. 2, of a cutoff device 8. A control circuit 150 is connected to the terminals 131 providing the connection to the pyrotechnic igniter 103. The circuit 150 receives a low-voltage power supply 151 and comprises a galvanic isolation DC/DC element 152 between the low-voltage power supply 151 and the control elements of the pyrotechnic charge. The circuit 150 may form part of the control unit 14 of FIG. 1.

The circuit 150 comprises a first control channel 154 reacting to too great an intensity in the line 5. This first channel 154 comprises a current sensor 155 constantly measuring the current on the line 5. The sensor 155 is connected to a comparator 156 itself connected to a logic "OR" gate 157. The output of the logic gate 157 is connected to a power transistor 158 for example of the MOSFET type which, when it receives the appropriate signal from the logic gate 157, injects a control current to the terminals 131 of the pyrotechnic igniter 103. Preferably, the pyrotechnic element is intentionally supercharged in order to accelerate the ignition of the charge, by 3 to 5 times the nominal current for which it is designed. Preferably, the power transistor 158 is connected to a capacitor storing the energy necessary to establish the control current.

The circuit 150 also comprises a second control channel 161 reacting to other types of defects such as a defect in a stacking of accumulator elements. This second channel 161 comprises an optocoupler 162 connected to the other input of the logic gate 157.

It is important to note that, during the operation of the cutoff device 8, no galvanic isolation can be provided between the terminals 131 and the pole 121 hence the control circuit 150 is set at the same electrical potential as the pole 121. Similarly, after cutoff, it is possible that, simply by electrical influence, the poles 121 and 122 take or retain the same electrical potential which may be high. By virtue of the galvanic isolation provided by the DC/DC element 152 and/or by the optocoupler 162, it becomes possible to effectively ensure the control of the cutoff device while maintaining the galvanic isolation of the upstream electronic components providing the low-voltage power necessary for the said control.

Thus, the cutoff device 8 is capable of very rapidly breaking an electrical current. The time that elapses between the beginning of the establishment of the control signal and the end of the cutoff of the electrical circuit is of the order of 300 to 400 microseconds.

Figure 4:
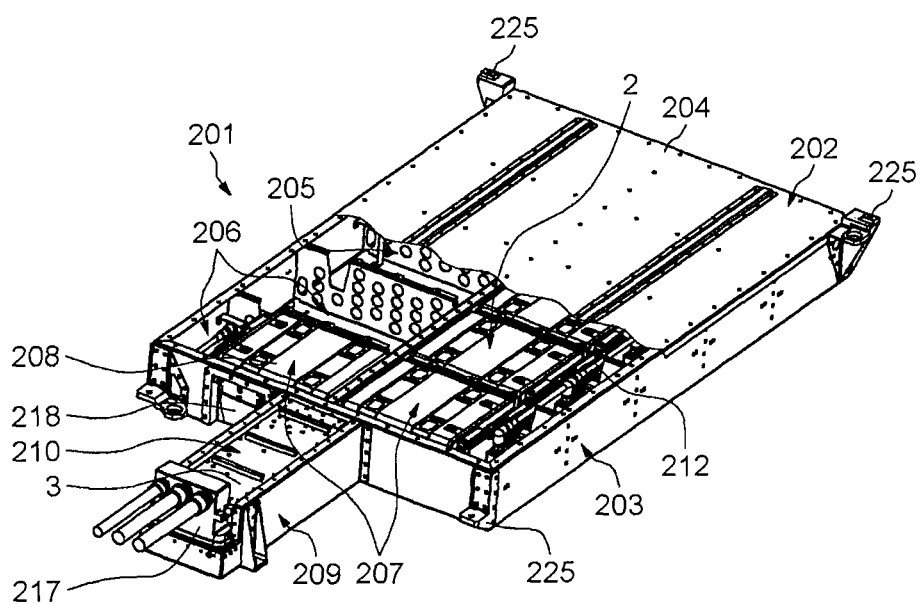
FIG. 4 represents an external view in perspective of a battery housing partially open.

FIG. 4 represents a battery housing 201 designed to be installed removably beneath the chassis of a vehicle. The housing 201 comprises an outer casing 202 of generally parallelepipedal shape, for example made of metal, which comprises a rectangular, dish-shaped support 203 in which a battery 2 is installed, a cover 204 being mounted on a peripheral rim of the support.

Provided in the support 203 is a partition 205 which determines adjacent compartments 206 in which the accumulator blocks 207 that comprise isolating enclosures 208 containing electrical-energy accumulator assemblies forming the battery 2 can be placed.

In the example shown, the partition 205 determines two rows of five compartments 206 accommodating in all ten accumulator blocks 207, while leaving internal spaces for the running of connection wires.

In this embodiment, the support 203 has a central extension 209 of lesser width than that of the support 203, determining a secondary compartment 201 in which a connection device 3 is placed at least in part. Thus, placed in the compartment 210 are the cutoff device 8, the electrical or electronic device 9 and the control unit 14 of the battery 2. In this embodiment, the battery housing 201 therefore incorporates the connection device 3.

An electrical connector 217 can be connected to the outputs of the connection device 3 through the wall of the secondary compartment 210 for the purpose of the electrical connections of the battery 2.

Figure 5:
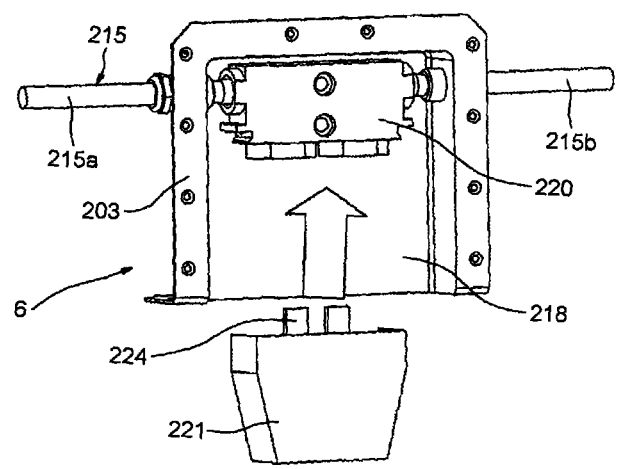
FIG. 5 represents a view in perspective of a manually controlled breaker.

In a side wall of the support 203, adjacent to the extension 209, a hollow recess 218 (see FIG. 5) is arranged that is open sideways and downwards below the support 203. In this hollow recess 218 a manually controlled breaker 6 is installed which comprises a socket 220 attached in the top portion of the hollow recess 218 and a removable member 221. The member 221 is therefore accessible from the outside of the casing 202, to the side and beneath the vehicle.

The socket comprises two electrical contact pins spaced apart that are connected to an electrical cable 215. Accordingly, the electrical cable 215 comprises two portions 215a and 215b, the portion 215a being connected to the input of the connection device 3, that is to say to the terminal 2a of the battery 2, and to the first electrical contact pin. The portion 215b is connected to the second electrical contact pin and to the cutoff device 8.

The removable member 221 supports a cutoff bar 224 that is capable, when the member 221 is coupled to the socket 220, from bottom to top, of electrically connecting together the electrical contact pins of the socket 220 so that the output of the battery 2 is connected to the cutoff device 8 and then to the relay device 9.

When the removable member 221 is uncoupled from the socket 220, from top to bottom, the electrical contact pins of the socket 220 are isolated, so that the output of the battery 2 is no longer connected to the cutoff device 8 and to the relay device 9, and is therefore isolated.

The outer casing 202 is furnished with means for installing it beneath a vehicle, which means may comprise attaching lugs 225 mounted against the side wall of the support 203 and judiciously distributed on its periphery.

By virtue of the provision of the manually controlled breaker 6, it is possible to isolate the battery when it is necessary to carry out work on the battery housing 201, in particular when it is installed on the vehicle or when it is removed, or when it is necessary to work generally on the electrical circuits of the vehicle.

In a variant embodiment, it would also be possible to provide a manually controlled breaker on the electrical cable connecting the negative terminal of the battery 2 to the common negative terminal.

As has been described, the manually controlled breaker 6 is accessible from beneath the vehicle. In a variant embodiment, the manually controlled breaker could be accessible from inside the vehicle, for example through an aperture formed by a hatch.

Therefore, by virtue of such a battery housing, it is possible not only to detect a malfunction of the battery but also to rapidly disconnect the battery from the vehicle when this malfunction may cause damage to the electrical material of the vehicle.

Finally, the battery housing also makes it possible to take account of the safety of the people working on the vehicle, by virtue notably of a manually controlled breaker making it possible to open the electrical circuit of the battery before any maintenance or installation/removal work.

The invention claimed is:

1. A connection device for connecting a battery to an electric or hybrid motor vehicle, comprising at least one first input adapted to be connected to a terminal of the battery and an output adapted to be connected to a first terminal of an electrical circuit of the vehicle, the device also comprising an electrical-circuit cutoff device mounted in series between the input and the output of the connection device, wherein the cutoff device comprises a pyrotechnic igniter connected to control terminals, the electrical opening of the cutoff device being controlled by an electrical control signal generated by a control circuit applied to said control terminals, and wherein the connection device also comprises a control unit comprising the control circuit and being adapted to deliver the electrical control signal to said control terminals, wherein the control circuit comprises:
   a comparator configured to compare a threshold current with the current measured by a current sensor in series with the cutoff device, the comparator being connected to a logic gate,
   an optocoupler configured to react to types of defects other than an overcurrent circulating through the cutoff device, the optocoupler being connected to the logic gate,
   a power translator configured to inject a control current to the pyrotechnic igniter upon receiving an appropriate signal from the logic gate, and
   a DC/DC element connected on one side to a power supply and on the other side to the pyrotechnic igniter.

2. The connection device according to claim 1, wherein the control unit is adapted to detect an electrical over current between a terminal of the battery, notably the terminal of the battery connected to the input of the connection device, and the chassis of the vehicle, and is adapted to deliver the electrical control signal when the over current is detected.

3. The connection device according to claim 1, also comprising a manually controlled breaker mounted in series, between the input of the connection device and the cutoff device.

4. The connection device according to claim 1, also comprising a cutout switch mounted in series, between the cutoff device and the output of the connection device, the electrical opening of the cutout switch being controlled by an electrical control signal applied to said cutout switch.

5. The connection device according to claim 1, comprising several outputs adapted to be electrically connected to electrical members of the vehicle, and also comprising a relay device for connecting the battery to the various electrical members of the vehicle, mounted between the cutoff device and the outputs, the relay device comprising a cutout switch and optionally a fuse mounted in series between the cutoff device and each of the outputs, the electrical opening of the cutout switch being controlled by an electrical control signal applied to said cutout switch.

6. The connection device according to claim 4, wherein the control unit is adapted to deliver the electrical control signal applied to said cutout switch.

7. A battery housing for an electric or hybrid vehicle, comprising a battery and a connection device according to claim 1.

8. The battery housing according to claim 7, comprising:
   an outer casing delimiting a receiving chamber,
   an internal partition delimiting at least one compartment in said chamber,
   at least one accumulator block being placed in said compartment and comprising an insulating enclosure for receiving an electrical-power accumulator assembly,
   the electrical cutoff device being mounted inside the outer casing.

9. The battery housing according to claim 8, wherein the manually controlled breaker is mounted on the outside of the outer casing.

* * * * *